United States Patent
Uejima et al.

[11] Patent Number: 6,154,374
[45] Date of Patent: Nov. 28, 2000

[54] POWER SUPPLY CIRCUIT

[75] Inventors: Hiroto Uejima, Kusatsu; Hidenori Okuda, Kouka-gun; Isamu Okuda, Ohtsu; Takashi Uno, Matsuzaka; Toshikazu Masuzawa, Kusatsu, all of Japan

[73] Assignee: Matsushita Electric Industrial Co., Ltd., Osaka, Japan

[21] Appl. No.: 09/348,059

[22] Filed: Jul. 6, 1999

[30] Foreign Application Priority Data

Jul. 7, 1998 [JP] Japan .................. 10-191430

[51] Int. Cl.$^7$ ................... H02M 3/335
[52] U.S. Cl. ................... 363/16; 363/21
[58] Field of Search .................. 363/16, 20, 21, 363/95, 97

[56] References Cited

U.S. PATENT DOCUMENTS

| | | | |
|---|---|---|---|
| 5,453,904 | 9/1995 | Higashiyama et al. | 361/103 |
| 5,453,921 | 9/1995 | Shutts | 363/21 |
| 5,920,466 | 7/1999 | Hirahara | 363/21 |

*Primary Examiner*—Jessica Han
*Attorney, Agent, or Firm*—Greenblum & Bernstein, P.L.C.

[57] ABSTRACT

A power supply circuit capable of reducing the power consumption during the standby state of an electric appliance. The power supply circuit for supplying the electric appliance with voltages to drive and control the electric appliance, includes a controller for controlling the operation of the electric appliance, a DC-DC converter for outputting a fixed voltage $V_1$ and a variable voltage $V_2$, and a regulator for converting the fixed voltage $V_1$ derived from the DC-DC converter into a specified voltage and supplying the specified voltage to the controller 16 for the electric appliance. The DC-DC converter identifies the state of the air conditioner. When the electric appliance is identified to be in the standby state, the DC-DC converter reduces the fixed voltage $V_1$, which is inputted to the regulator to a voltage lower than a voltage outputted in the operative state.

11 Claims, 3 Drawing Sheets

POWER SUPPLY CIRCUIT

CROSS-REFERENCE TO RELATED APPLICATIONS

This application is based on an application No. H10-191430 filed in Japan, the disclosure of which is herein incorporated by reference.

BACKGROUND OF THE INVENTION

1. (Field of the Invention)

The present invention relates to a power supply circuit and, more particularly, to the power supply circuit for supplying a voltage via two DC-DC converters to a control circuit for controlling electric appliances.

2. (Description of the Related Art)

It is well known that depending on the type of electric appliances, the electric circuitry used therein requires the use of a plurality of power sources. By way of example, an air conditioner for air-conditioning a house room or the like space makes use of a control power source for supplying an electric power to a control circuit system including a controller that controls the air conditioner, an actuator power source for supplying an electric power to various driving mechanisms or actuators such as relays and stepping motors, and a drive power source for driving a fan motor. These power sources provide different direct current (DC) voltages appropriate to the different electric component parts to be fed. For example, the control power source provides a 5-volt DC voltage, the actuator power source provides a 12-volt DC voltageactuator power source, and the drive power source provides a variable DC voltage ranging of 0 to 40 volts.

FIG. 3 shows the prior art power supply circuit for a fan motor and control system circuits in the air conditioner. In this prior art power supply circuit, an AC voltage derived from a commercial AC power outlet 9 is rectified by a rectifier circuit 11, and the rectified DC voltage from the rectifier circuit 11 is then converted by a DC-DC converter 15 into a fixed output voltage $V'_1$ and a variable output voltage $V'_2$. Not only is the fixed output voltage $V'_1$ (12 V) from the DC-DC converter 15 used as an actuator power source, but the fixed output voltage $V'_1$ is, after having been converted into a predetermined voltage (5 V) in a regulator 17 which outputs a stabilized steady voltage, also used as a control power source. On the other hand, the variable output voltage $V'_2$ from the DC-DC converter 15 is converted into a three-phase AC voltage by an inverter 19 and is then supplied to a fan motor 21. The magnitude of the variable output voltage $V'_2$ is controlled according to a control duty signal derived from a controller 16.

The power loss $W_{loss}$ produced in the regulator 17 is expressed by the following equation:

$$W_{loss}=I(V_{in}-V_{out}) \quad (1)$$

where I is the consumption current of the control system circuits, i.e., the current consumed by the control system circuits, $V_{in}$ is the input voltage to the regulator 17 (i.e., the fixed output voltage $V'_1$ of the DC-DC converter 15), and $V_{out}$ is the output voltage from the regulator 17.

Because the consumption current I of the control system circuits and the output voltage $V_{out}$ of the regulator 17 are both constant, the power loss $W_{loss}$ in the regulator 17 decreases with decrease of the fixed output voltage $V'_1$ of the DC-DC converter 15, as seen from Equation (1).

During a standby state of the air conditioner, the fan motor 21 is kept halted with no variable output voltage $V'_2$ consequently utilized, but the fixed output voltage $V'_1$ is required to keep the control system circuits in operation. However, in this prior-art power supply circuit, during the standby state, a high voltage (12 V) equal to a voltage during the operation is outputted to the regulator 17 so that the latter can provide the voltage required by the control system circuits, while the regulator 17 requires a low voltage (e.g., 6 V) in order for it to produce a voltage (5 V) necessary to drive the control system circuits. Therefore, in the prior art circuit, a wasteful power loss arises in the regulator 17 as understood from Equation (1), resulting in an increased power consumption in the power supply circuit.

SUMMARY OF THE INVENTION

The present invention is directed to solve these problems, and an object of the invention is to provide a power supply circuit capable of reducing the power consumption in the standby state of electrical appliance, for example, a power supply circuit suitable for air conditioners.

In a first aspect of the invention, a power supply circuit comprises a controller, a first voltage converter and a second voltage converter. The controller controls electric appliances. The first voltage converter converts a DC voltage derived from a DC power supply into at least one fixed voltage and outputs the fixed voltage. The first voltage converter includes a fixed voltage controller to control output of the fixed voltage converter. The second voltage converter converts the fixed voltage derived from the first voltage converter into a predetermined voltage and supplies the predetermined voltage to the controller. The fixed voltage controller of the first voltage converter decides whether or not the electric appliance is in a standby state. When the electricappliance is decided to be in the standby state, the fixed voltage controller reduces the fixed voltage to a voltage lower than the voltage that is outputted during an operative state of the electric appliance.

In the power supply circuit, the controller may output to the first voltage converter a standby signal indicating the standby state while the electric appliance is in the standby state and the fixed voltage controller of the first voltage converter may receive the standby signal from the controller and decide whether or not the electric appliance is in the standby state based on the received standby signal. In this case, the controller may make the standby signal active in the standby state of the electric appliance; and the fixed voltage controller may decide that the electric appliance is in the standby state when the standby signal is active. Otherwise, the controller may output the standby signal to the first voltage converter when the electric appliance is in the operative state, and make the standby signal indeterminate by outputting no standby signal when the electric appliance is in the standby state. Then the fixed voltage controller may receive the standby signal and decide that the electric appliance is in the standby state when the standby signal is indeterminate. When the electric appliance changes over from the standby state to the operative state, the controller may start predetermined control for the operative state after a predetermined time elapses since the state changes.

In a second aspect of the invention, the power supply circuit comprises a controller, a first voltage converter, a second voltage converter and an inverter. The controller controls an electric appliance. The first voltage converter converts a DC voltage derived from a DC power supply into at least one fixed voltage and one variable voltage, and outputs the voltages. The first voltage converter includes a fixed voltage controller for controlling output of the fixed voltage and a variable voltage controller for controlling magnitude of the variable voltage based on a control signal from the controller. The second voltage converter converts the fixed voltage derived from the first voltage converter into a predetermined voltage and supplies the predetermined voltage to the controller. The inverter is controlled by the controller and serves to convert the variable voltage derived from the first voltage converter into an AC voltage.

The fixed voltage controller of the first voltage converter receives the control signal for controlling magnitude of the variable voltage from the controller. When the fixed voltage controller receives no control signal for controlling magnitude of the variable voltage from the controller, the fixed voltage controller decides that the electric appliance is in the standby state, and reduces the fixed voltage to a voltage lower than a voltage outputted in an operative state to output the reduced fixed voltage to the second voltage converter.

In the power supply circuit, the controller may output the control signal and inhibit the inverter from operating when a fixed voltage for the operative state needs to be outputted to the second voltage converter in the standby state. The control signal may also be a pulse width modulated signal and the controller may makes a duty ratio of the control signal outputted in the standby state smaller than a duty ratio for the operative state. When the electric appliance changes over from the standby state to the operative state, the controller may start predetermined control for the operative state after a predetermined time elapses since the state changes.

According to the first aspect of the present invention, in the standby state of the electric appliance, the voltage inputted from the first voltage converter to the second voltage converter is suppressed to a low value within the range of voltage required to keep the controller to be driven, thereby resulting not only in suppression of the power loss in the second voltage converter, but also in reduction of the power consumption of the electric appliance. Also, a signal indicative of the standby state is outputted from the controller so that a decision can be made as to the standby state based on the signal derived from the controller, and the aforementioned standby operation is performed, by which standby control as required is enabled and power consumption reduction through the year is enabled. Furthermore, the controller makes the standby signal active in the operative state, and indeterminate in the standby state, thus enabling a halt in the standby state so that the power consumption is further reduced.

According to the second aspect of the present invention, the standby state is detected depending on the presence or absence of the control signal for controlling the variable voltage of the first voltage converter. This makes it possible to detect the standby state by using an existing signal, thus eliminating the need for a special port for the detection of the standby state in the controller. Also according to the second power supply unit of the present invention, when an output voltage for the operative state is necessary in the standby state, the controller outputs a control signal while inhibiting the inverter from operating, by which an output voltage for the operative state can be obtained even in the standby state. In this case, by making the duty ratio of the control signal as small as possible, loss in the first voltage converter can be suppressed.

Furthermore, according to the power supply circuits of the present invention, when the step is changed from standby to normal operation, the controller starts specified control for the normal operation after a specified time elapses since the state changes. Thus, since various types of control are started after the output of the first voltage converter is stabilized, a stable operation of the electrical machinery and apparatus can be realized.

BRIEF DESCRIPTION OF THE DRAWINGS

Other objects and attainments together with a fuller understanding of the invention will become apparent and appreciated by referring to the following description and claims taken in conjunction with the accompanying drawings, in which:

DETAILED DESCRIPTION OF THE PREFERRED EMBODIMENTS

Hereinbelow, embodiments of the power supply circuit according to the present invention are described with reference to the accompanying drawings. Each power supply circuit of these embodiments is a power supply circuit for an air conditioner, and comprises a DC-DC converter for generating at least a DC voltage necessary to drive various driving mechanisms of the air conditioner, and a regulator for generating a voltage to drive the control circuit of the air conditioner from an output voltage derived from the DC-DC converter. The power supply circuit, in a standby state of the air conditioner, reduces the magnitude of the input voltage, supplied from the DC-DC converter to the regulator, to a voltage lower than that required for the normal operation of the air conditioner. As a result of this, the power loss of the regulator in the standby state is suppressed low and the power consumption of the air conditioner is hence reduced. This operation is described in detail below.

(First Embodiment)

Figure 1:
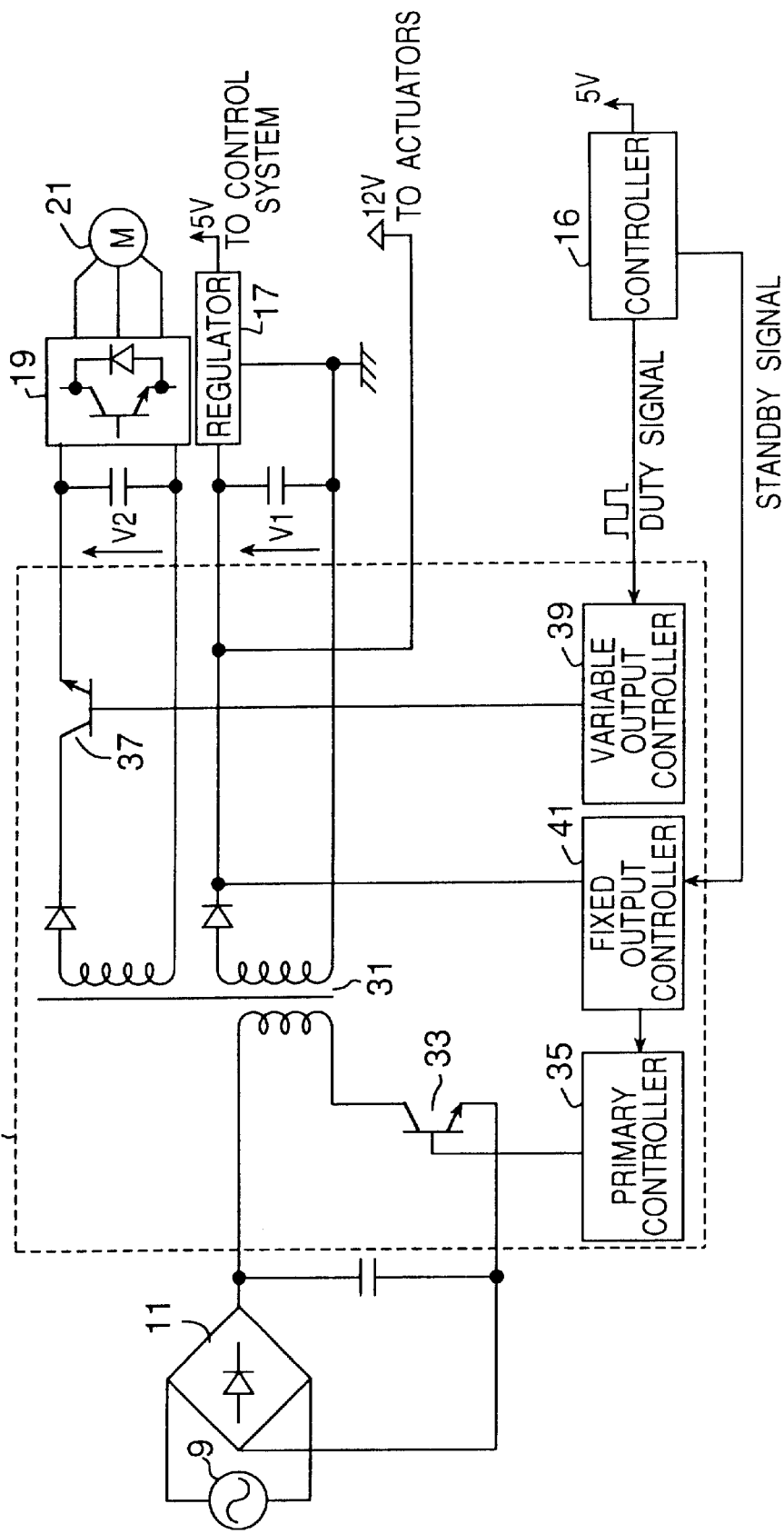
FIG. 1 is a schematic diagram of a power supply circuit for an air conditioner in the first to fourth preferred embodiments according to the present invention.

FIG. 1 shows the power supply circuit for the air conditioner in the first embodiment according to the present invention. As shown in FIG. 1, the power supply circuit comprises a rectifier circuit 11 for rectifying an AC voltage from an AC power source 9, a DC-DC converter 15 for receiving the rectified voltage and converting the received DC voltage into a fixed DC voltage $V_1$ and a variable DC voltage $V_2$, a regulator 17 for converting the fixed voltage $V_1$ from the DC-DC converter 15 into a specified voltage to output a stable DC voltage, and an inverter 19 for converting the variable voltage $V_2$ from the DC-DC converter 15 into a three-phase AC voltage to drive the fan motor 21 of an indoor heat-exchange unit of the air conditioner. The controller 16 controls various operations of the power supply circuit and other circuits in the air conditioner. The controller 16, for example, may be implemented by a microprocessor.

The DC-DC converter 15 comprises a transformer 31, a primary side switching device 33 for controlling a primary side input voltage of the transformer 31, a primary controller 35 for driving the primary side switching device 33, a secondary side switching device 37 for generating the variable voltage $V_2$ of the DC-DC converter 15, a variable output controller 39 for controlling the switching operation of the secondary side switching device 37, and a fixed output controller 41 for controlling the switching operation of the primary side switching device 33 to control the fixed voltage $V_1$.

The operation of the power supply circuit is explained below. The power supply circuit rectifies a voltage inputted from the AC power source 9 by the rectifier circuit 11, and converts the rectified DC voltage into a constant voltage (hereinafter, referred to as "fixed output voltage") $V_1$ of 12V and a voltage varying from 0 to 40 V (hereinafter, referred to as "variable output voltage") $V_2$ to output the voltages $V_1$ and $V_2$. The variable output voltage $V_2$ from the DC-DC converter 15 is converted into a three-phase AC voltage by the inverter 19 and is supplied to the fan motor 21 to drive the fan motor 21. Also, the fixed output voltage $V_1$ from the DC-DC converter 15 is converted into a specified low voltage (e.g., 5 V) through the regulator 17 and is supplied to the control system circuits including the controller 16 as a actuator power source. Moreover, the fixed output voltage $V_1$ outputted from the DC-DC converter 15 is directly supplied to various driving mechanisms (actuators or the like) of the air conditioner as a actuator power source to drive them.

The magnitude of the variable output voltage $V_2$ of the DC-DC converter 15 is controlled by the variable output controller 39 driving the switching device 37 based on a control duty signal from the controller 16. The control duty signal is a signal which has been pulse width modulated at a specified duty ratio, and the magnitude of the variable output voltage $V_2$ is controlled according to this duty ratio. Also, with respect to the fixed output voltage $V_1$, the fixed output controller 41, while detecting the output voltage, controls the switching operation of the switching device 33 via the primary controller 35, so that a fixed voltage can be obtained.

In this embodiment, during a period from when the air conditioner is powered on until when a drive command for the air conditioner is given by a remote control unit or the like to start operation of air conditioner, the fixed output controller 41 decides that the air conditioner is in a "standby state". During the standby state, the fixed output controller 41 outputs to the primary controller 35 a control signal for suppressing the fixed output voltage $V_1$ to a specified low voltage. In the fixed output controller 41, the decision as to whether the air conditioner has started to operate can be accomplished, for example, by detecting the variable output voltage $V_2$ of the DC-DC converter 15. In this case, more specifically, the specified low voltage is preferably the lowest possible value (e.g., 6 V) within such a voltage range as necessary for the regulator 17 to output a voltage (5 V in this case) necessary for the operation of the controller 16. Receiving this control signal, the primary controller 35 controls the switching operation of the switching device 33. As described above, the power supply circuit of this embodiment decides that the air conditioner is in the standby state during a period from power-on to operation start, and controls the fixed output voltage $V_1$ in the standby state to a value (6 V) lower than the fixed output voltage $V_1$ (12 V) in the operative state (hereinafter, this control is referred to as "standby power control"). As a result of this, the power loss in the regulator 17 in the standby state can be reduced and the power consumption of the air conditioner can be cut down.

(Second Embodiment)

Next, the operation of the power supply circuit during the standby state of the air conditioner according to another embodiment is described. Circuit configuration and operation of the power supply circuit of this embodiment are basically the same as those in the first embodiment.

In the first embodiment, it has been arranged that, for the period from power-on to operation start only, which is taken as the standby state, the standby power control is performed. In the present embodiment, the controller 16 outputs a standby signal representing whether or not the air conditioner is in the standby state, and standby power control is performed based on this standby signal. More specifically, the controller 16 makes the standby signal "active" for the standby state, and "inactive" for the operative state. Receiving a standby signal from the controller 16, the fixed output controller 41 decides the standby state by determining whether or not the standby signal is active in order to perform the standby power control.

With this arrangement, it is possible to identify the state (standby state or operative state) not only at the time of power-on, but also at any time, for example, when the air conditioning operation is suspended temporarily. Therefore, standby power control can be effected as required, so that the power consumption can be reduced throughout the year.

(Third Embodiment)

The operation of the power supply circuit during the standby state of the air conditioner according to a third embodiment is described below. Circuit configuration and operation of the power supply circuit of this embodiment are basically the same as in the second embodiment. In the second embodiment, the controller 16 outputs a standby signal regardless of whether the air conditioner is in the standby state or the operative state, and thus the controller 16 has to be operative also in the standby state. As a result, power is consumed in the controller 16 even in the standby state.

Therefore, in the power supply circuit of this embodiment, the controller 16 is so designed as not to output the standby signal during the standby state. With this arrangement, the controller 16 can be put into a halt so that the power consumption in the controller 16 can be reduced. Thus, the power consumed in the standby state can be further reduced.

More specifically, the controller 16 outputs a standby signal only in the operative state (where the standby signal is held "active"), while the controller 16 does not output a standby signal in the standby state. This means that the standby signal becomes indeterminate in the standby state. Accordingly, deciding that the air conditioner is in the standby state when the standby signal is indeterminate, the fixed output controller 41 controls the fixed output voltage $V_1$ to a voltage (6 V) lower than that in the operative state.

(Fourth Embodiment)

The operation of the power supply circuit during the standby state of the air conditioner according to a forth embodiment is described below.

In this embodiment, in the power supply circuit as described in the foregoing embodiment, when the state is changed from the standby state to the operative state, the controller 16 starts a predetermined control (control for actuators or the like) for a normal operative state after a predetermined time elapses. The predetermined time may be set more than period from when the state changes until when the fixed output voltage $V_1$ of the DC-DC converter 15 is stabilized. As to the reason for this, when the fixed output controller 41 halts the standby control and increases the fixed output voltage $V_1$ from 6 V to 12 V, specified time is required until the fixed output voltage $V_1$ is stabilized to 12 V. Therefore, the control for actuators or the like is not effected until the fixed output voltage $V_1$ is stabilized, such that a stable operation of the driving mechanisms is enabled.

(Fifth Embodiment)

In the operative state of the air conditioner, a variable voltage is outputted to drive the fan motor 21. For this purpose, a control duty signal for controlling the variable voltage is outputted from the controller 16 in the operative state. Meanwhile, in the standby state in which the fan motor 21 is not operated, the control duty signal is not provided. Therefore, in this embodiment, a decision of whether or not the air conditioner is in the standby state is made based on the presence or absence of the control duty signal, and hence, the power consumption in the standby state is reduced.

Figure 2:
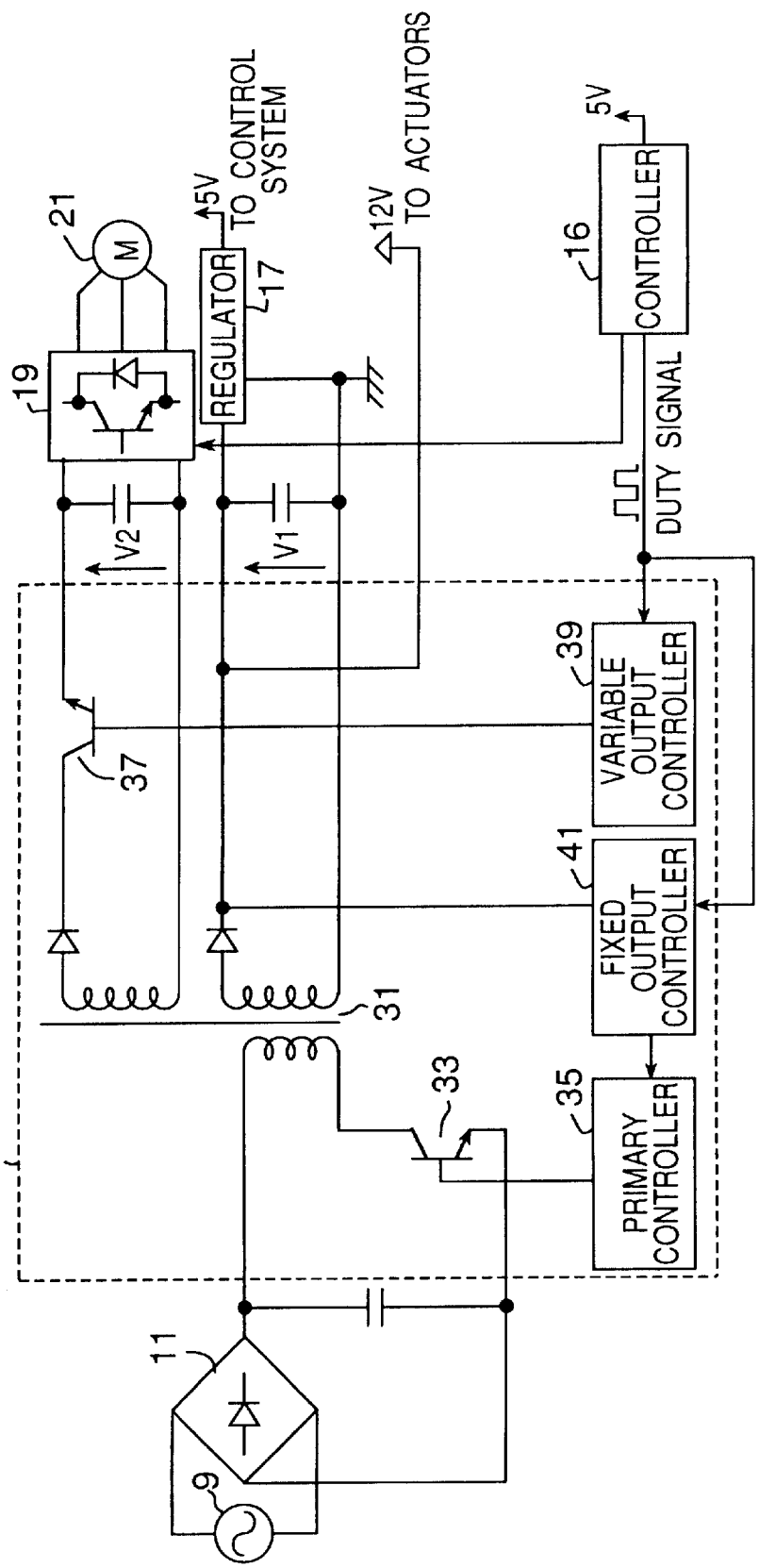
FIG. 2 is a schematic diagram of the power supply circuit for the air conditioner in the fifth preferred embodiment according to the present invention.
Figure 3:
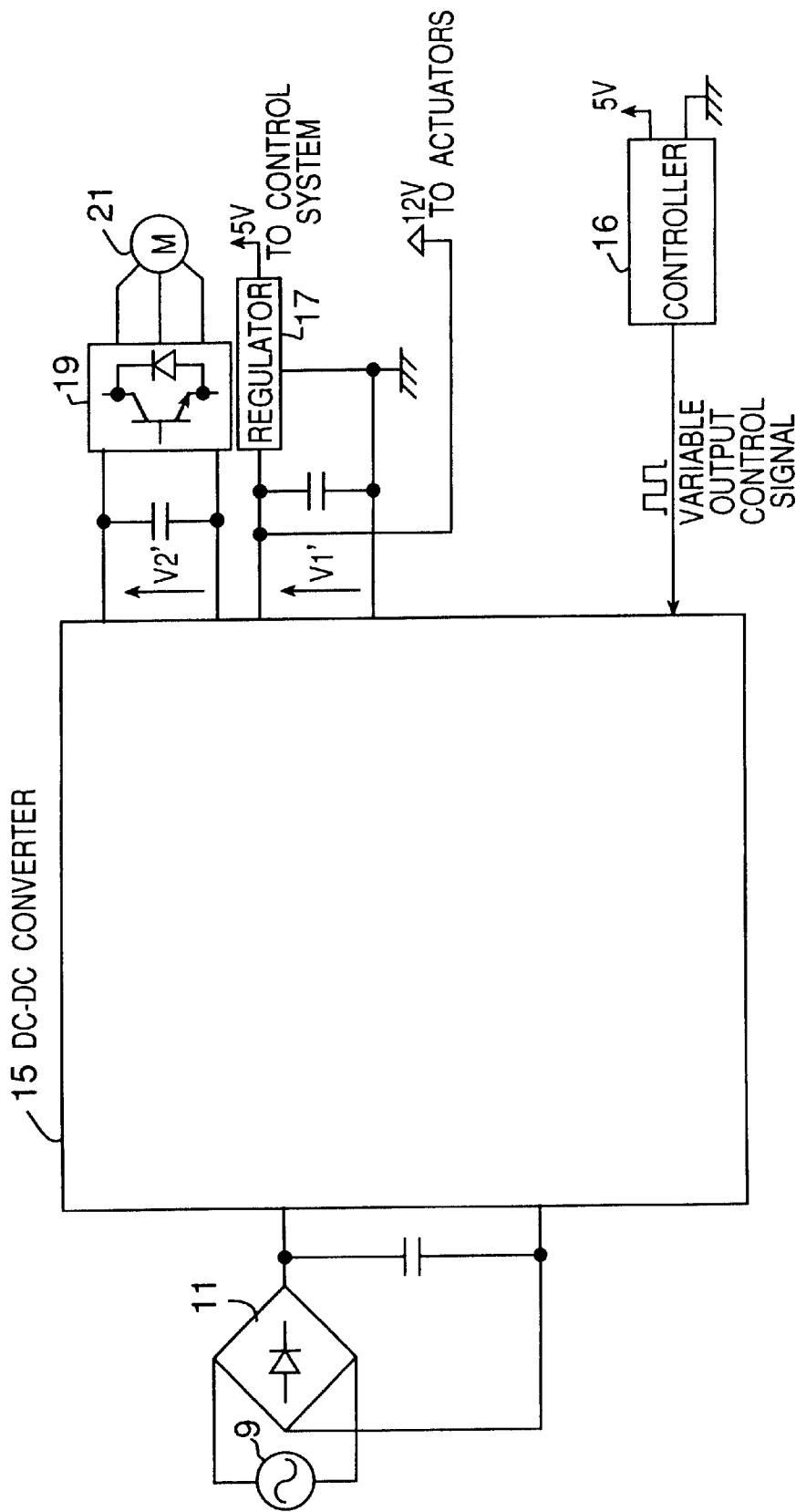
FIG. 3 is a schematic diagram of the power supply circuit for the air conditioner according to the prior art.

FIG. 2 shows the power supply circuit for the air conditioner according to this embodiment. The power supply circuit of this embodiment is similar to that of the first embodiment, but differs therefrom in that the control duty signal for the fixed output controller 41 to control the variable output voltage $V_2$ is inputted from the controller 16.

More specifically, the fixed output controller 41 of this embodiment makes a decision as to the standby state based on the presence or absence of an output of the control duty signal, where when the fixed output controller 41 receives no control duty signal, the fixed output controller 41 decides that it is in the standby state, and controls the fixed output voltage $V_1$ to a voltage (6 V) lower than that in the operative state. Similarly, by making a decision as to the standby state with reference to the control duty signal on the fixed output controller 41, the port used for standby signal output in the controller 16 can be eliminated.

(Sixth Embodiment)

In the fifth embodiment, there are some cases where various driving mechanisms of the air conditioner must be operated even during the halt of the fan motor 21 (for example, when flaps for changing the direction of air blow is changed in angle at a reset) so that a power supply (12 V) to the power system circuit is required. However, in the power supply circuit of the fifth embodiment, the fixed output controller 41 controls the fixed output voltage $V_1$ to a low voltage (6 V) so that an enough power to the power system circuit cannot be obtained, since the control duty signal is not outputted during the halt of the fan motor 21.

Therefore, in this embodiment, in the power supply circuit of the fifth embodiment, in order to control the fixed output voltage $V_1$ to 12 V even during the halt of the fan motor 21, the controller 16;

1) outputs the control duty signal, and
2) at the same time, inhibits the inverter 19 from operating, thereby inhibiting the fan motor 21 from being driven when the power supply to the power system circuit is required during the halt of the fan motor 21.

In this case, preferably, the duty ratio of the control duty signal is set to a minimum value as long as the fixed output controller 41 can recognize the duty ratio. This is because the power loss in the DC-DC converter 15 increases with increasing duty ratio of the control duty signal.

In addition, also in the fifth and sixth embodiments, when the state changes from the standby state to the operative state, the controller 16 may start the control of actuators or the like after a predetermined time elapses until the fixed output voltage $V_1$ is stabilized, as shown in connection with the forth embodiment.

The above embodiments have been described in connection with respect to the power supply circuit for the air conditioner. However, although not exclusively limited thereto, the present invention may be applied to any other electric appliances, provided that the electric appliance is provided with a control section and two DC-DC voltage conversion means and voltage is supplied to the control section via the two voltage conversion means.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A power supply circuit comprising:

a controller for controlling an electric appliance;

a first voltage converter for converting a DC voltage derived from a DC power supply into at least one fixed voltage and outputting the fixed voltage, the first voltage converter including a fixed voltage controller for controlling output of the fixed voltage; and a second voltage converter for converting the fixed voltage derived from the first voltage converter into a predetermined voltage and supplying the predetermined voltage to the controller, wherein the fixed voltage controller decides whether or not the electric appliance is in a standby state, and when the electric appliance is decided to be in the standby state, the fixed voltage controller reduces the fixed voltage to a voltage lower than a voltage outputted in an operative state to output the reduced fixed voltage to the second voltage converter.

2. The power supply circuit according to claim 1, wherein the controller outputs to the first voltage converter a standby signal indicating the standby state while the electric appliance is in the standby state; and the fixed voltage controller of the first voltage converter receives the standby signal from the controller and decides whether or not the electric appliance is in the standby state based on the received standby signal.

3. The power supply circuit according to claim 2, wherein the controller makes the standby signal active in the standby state of the electric appliance; and the fixed voltage controller decides that the electric appliance is in the standby state when the standby signal is active.

4. The power supply circuit according to claim 2, wherein the controller outputs the standby signal to the first voltage converter when the electric appliance is in the operative state, and makes the standby signal indeterminate by outputting no standby signal when the electric appliance is in the standby state, and the fixed voltage controller of the first voltage converter receives the standby signal and decides that the electric appliance is in the standby state when the standby signal is indeterminate.

5. The power supply circuit according to claim 1, wherein when the electric appliance changes over from the standby state to the operative state, the controller starts predetermined control for the operative state after a predetermined time elapses since the state changes.

6. The power supply circuit according to claim 1, wherein the electric appliance comprises an air conditioner.

7. A power supply circuit comprising:

a controller for controlling an electric appliance;

a first voltage converter for converting a DC voltage derived from a DC power supply into at least one fixed voltage and one variable voltage, and outputting the voltages, the first voltage converter including a fixed voltage controller for controlling output of the fixed voltage and a variable voltage controller for controlling magnitude of the variable voltage based on a control signal from the controller;

a second voltage converter for converting the fixed voltage derived from the first voltage converter into a predetermined voltage and supplying the predetermined voltage to the controller; and an inverter controlled by the controller and serving for converting the variable voltage derived from the first voltage converter into an AC voltage, wherein the fixed voltage controller of the first voltage converter receives the control signal for controlling magnitude of the variable voltage from the controller, and when the fixed voltage controller receives no control signal for controlling magnitude of the variable voltage from the controller, the fixed voltage controller decides that the electric appliance is in the standby state, and reduces the fixed voltage to a voltage lower than a voltage outputted in an operative state to output the reduced fixed voltage to the second voltage converter.

8. The power supply circuit according to claim 7, wherein the controller outputs the control signal and inhibits the inverter from operating when a fixed voltage for the operative state needs to be outputted to the second voltage converter in the standby state.

9. The power supply circuit according to claim 8, wherein the control signal is a pulse width modulated signal and the controller makes a duty ratio of the control signal outputted in the standby state smaller than a duty ratio for the operative state.

10. The power supply circuit according to claim 7, wherein when the electric appliance changes over from the standby state to the operative state, the controller starts predetermined control for the operative state after a predetermined time elapses since the state changes.

11. The power supply circuit according to claim 7, wherein the electric appliance comprises an air conditioner.

* * * * *